United States Patent [19]
Wicks et al.

[11] 3,714,654
[45] Jan. 30, 1973

[54] ECM PULSE ANALYZER
[75] Inventors: Steven A. Wicks; Robert W. Jones, both of San Diego, Calif.
[73] Assignee: The United States of America as represented by the Secretary of the Navy
[22] Filed: Jan. 6, 1972
[21] Appl. No.: 215,806

[52] U.S. Cl. ............343/18 E, 343/5 DP, 343/17.1 R
[51] Int. Cl. ..............................G01s 7/30, G01s 7/36
[58] Field of Search...............343/5 DP, 17.1 R, 18 E

[56] References Cited
UNITED STATES PATENTS

| | | | |
|---|---|---|---|
| 3,375,515 | 3/1968 | Novikoff | 343/18 E |
| 3,383,604 | 5/1968 | Weiss | 343/18 E |
| 3,504,366 | 3/1970 | Tolles et al | 343/18 E |

*Primary Examiner*—Malcolm F. Hubler
*Attorney*—R. S. Sciascia et al.

[57] ABSTRACT

ECM pulse analyzer apparatus for automatically measuring pulse repetition frequency (PRF) and pulsewidth (PW) of incoming pulsed signals received by ECM receivers. Pulsewidth is measured by dual-threshold circuitry which eliminates noise effects by means of a high threshold level which sorts pulses for minimum amplitude and a lower threshold level at which pulsewidth is measured when a pulse exceeds the higher threshold. Pulse repetition frequency is measured by counting PRI during the two periods between the three pulses and converting PRI into PRF by counting up to the stored PRI value at a known rate in a predetermined time period whereby the number of times that the count can proceed is equal to the PRF corresponding to the stored PRI.

2 Claims, 5 Drawing Figures

PATENTED JAN 30 1973 3,714,654

ECM PULSE ANALYZER

BACKGROUND OF THE INVENTION

Prior art pulse analyzer apparatus have used signal generators to match the PRF of a generated signal to the PRF of an incoming pulsed signal such that in a matched condition, the frequency of the incoming signal is equal to that of the generated signal. Such an approach, however, requires time-consuming, precise manual operation of the signal generators used. Furthermore, if many low-level signals are being received, the weaker ones are often masked by the stronger ones, thereby reducing the effectiveness of this approach. Finally, prior art pulse analyzers generally are not operable in a radar scanning mode.

SUMMARY OF THE INVENTION

Automatic radar pulse analyzer apparatus which is operationally compatible with shipboard ECM analysis receivers to measure PRF and pulsewidth of incoming pulsed radar signals is disclosed. The apparatus is operable on as few as three consecutive pulses and measures pulsewidth by means of a dual-threshold technique by which a pulsewidth measurement is made at a first threshold level only if the pulse amplitude exceeds a higher second threshold level. Pulse repetition frequency is measured by counting PRI during the two periods between the three pulses and then converting the stored PRI into PRF by counting up to the stored PRI value at a known rate in a predetermined time period, whereby the number of times that the count can proceed is equal to the PRF of the pulses. The apparatus can analyze more than three incoming signals in a gated mode wherein signals are first presorted to measure only certain pulses even in a dense signal environment.

OBJECTS OF THE INVENTION

The primary object of the present novel invention is to advance the state-of-the-art of radar pulse analyzers by disclosing novel apparatus for use with shipboard ECM receivers to automatically and rapidly measure PRF and PW of as few as three consecutive pulsed signals.

Other objects, advantages and novel features of the invention will become apparent from the following detailed description of the invention when considered in conjunction with the accompanying drawings.

DESCRIPTION OF THE PREFERRED EMBODIMENT

Figure 1:
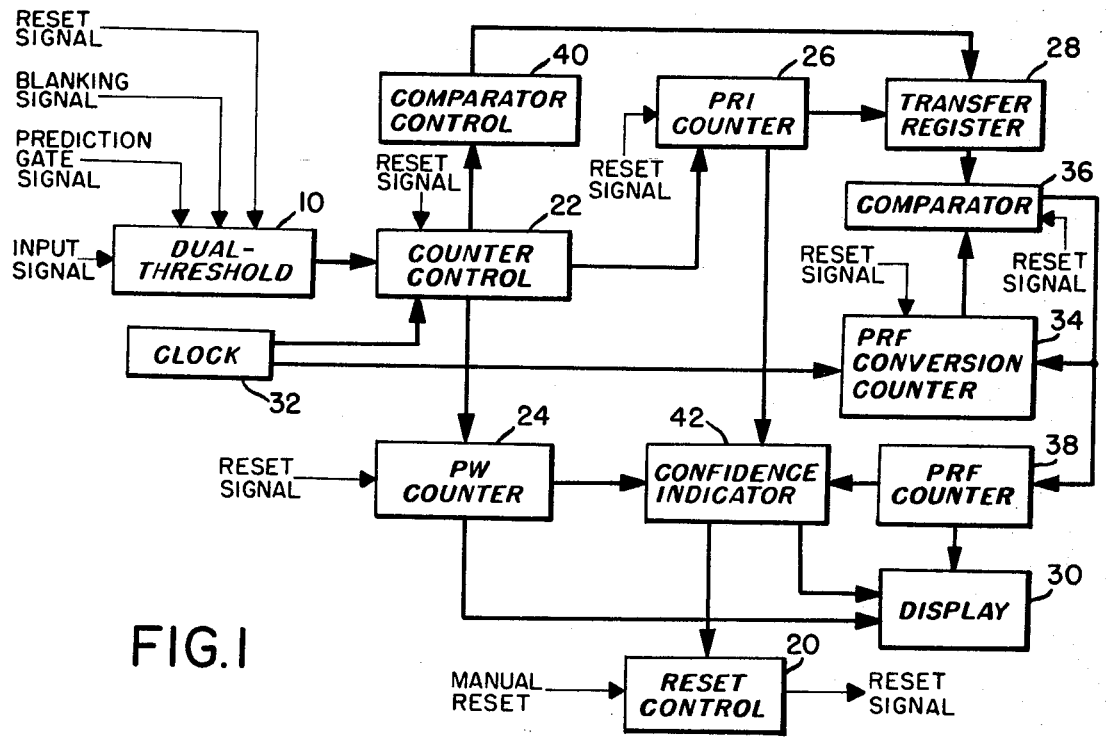
FIG. 1 illustrates in simplified block-diagram form the preferred embodiment of pulse analyzer apparatus embodying the inventive concept to be disclosed herein.

The preferred embodiment of the present inventive concept is illustrated in the simplified block diagram of FIG. 1. The apparatus shown therein comprises a novel radar pulse analyzer which can automatically measure PRF and pulsewidth of incoming pulsed video signals which are received by an ECM analysis receiver.

The apparatus measures pulsewidth very accurately by means of dual-threshold circuit 10 which essentially creates a minimum amplitude requirement for PW measurements by blocking lower amplitude video pulses from the measurement process. In operation, the circuit 10 measures PW at a first threshold $T_1$ only if incoming pulse amplitude exceeds a second threshold $T_2$ which is higher than $T_1$ as shown in FIG. 3.

Figure 2:
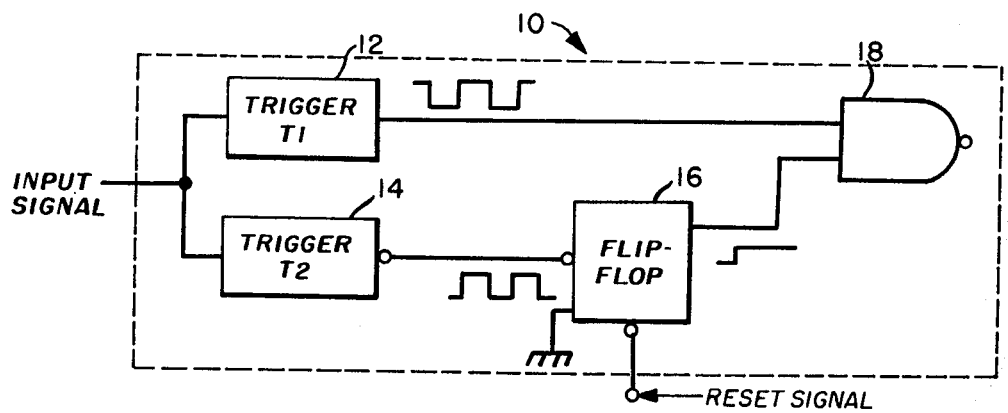
FIG. 2 illustrates in simplified schematic form the dual-threshold pulse shaping circuit of FIG. 1.

The dual-threshold circuit 10 which is shown schematically in FIG. 2 can comprise two logic trigger circuits 12 and 14, a flip-flop 16, and a logic gate 18 which function in a conventional manner to normalize the amplitudes and rise times of the video pulses and to use the normalized pulses to gate clock pulses to the PW counter 24 for width determination. In operation, three consecutive pulses are necessary to complete a PW measurement. The first pulse A must activate the trigger circuit 14, i.e., exceed the minimum amplitude threshold $T_2$ requirement to initiate a PW measurement and a first pulse repetition period A.

The second and third pulses, B and C, terminate the first and second repetition periods, respectively. The PW measurement thus begins when the first pulse crosses the second threshold $T_2$ and ends when it recrosses the first threshold $T_1$.

Figure 3:
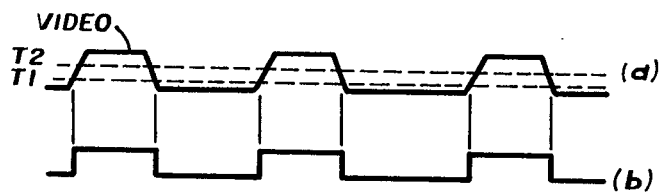
FIG. 3 illustrates graphically the dual-threshold operation performed by the above circuit.

FIG. 3 illustrates in simplified graphical form the video input waveforms and pulse outputs of the dual-threshold signal conditioner circuit 10 discussed above.

It should be noted that if an input pulse exceeds the minimum amplitude requirement it does so after the measurement should have begun at the lower threshold level. Accordingly, theoretically a time delay is required between the two thresholds to compensate for the time lag. In practice, however, it has been found that the time lag is negligible with reference to the rise time of an ECM analysis receiver, and hence can be ignored.

Since the shape of an incoming pulse is not as significant when PRF measurements are being made, PRF measurements can be accomplished more easily with the apparatus of FIG. 1 than pulsewidth measurements. That is, if the amplitude of an input pulse exceeds the minimum amplitude threshold for the required number of consecutive pulses, PRF can be determined.

Assuming that the pulse analyzer 10 has been reset by a reset signal from the reset control 20, the first input pulse which triggers the amplitude threshold $T_2$ will initiate the PRF measurement cycle. When this occurs, clock pulses are gated by the counter control unit 22 to the PW counter 24 and to PRI counter 26 until the lower threshold $T_1$ is crossed by a second pulse. At this time the clock pulse count in the PRI counter 26 is transferred to a transfer register 28 where it is stored for a predetermined period of time. The PRI counter 26 is then free to once more count during the second period, and it does so until the threshold $T_1$ is triggered a third time.

Two periods are measured to insure that all the pulses used in the PRF measurement are from the same pulse train. Since both PRF values can be read out on the display 30, an operator can check for agreement between values.

The counter control unit 22 can comprise a two-bit counter having its output coupled to a logic counter decoder. The decoder also receives clock pulses from the clock 32 and is responsive thereto to produce a PW pulse, a PRI pulse, and a second and third pulse which are fed to the comparator control unit 40.

After both periods are complete, the PRI to PRF conversion occurs as follows. The pulse repetition interval count for the first period is stored in the transfer register 28, and a clock signal from the clock generator 32 is gated to the PRF conversion counter 34 for a fixed period of time. The increasing count in this counter is then compared in the comparator 36 to the count stored in the transfer register 28.

When the two counts are equal, the comparator 36 generates an output pulse which is applied as a reset pulse to the PRF conversion counter 34 and as a PRF count to the PRF counter 38. At the end of the fixed time period the count stored in the PRF counter 38 corresponds to the original PRI within the accuracy of the system. When the PRI count for the first period is thus converted to PRF count, the second period PRI count is shifted into the transfer register 28, and the above process is repeated to determine the PRF for the second period.

The pulse analyzer apparatus continuously displays the measured parameters on the display unit 30 until the reset control unit 20 is manually reset by an operator. The data which appears on the display 30 may also be used on status boards, printers, computers and other digital equipment.

If the receiver video output comprises more than three signals, presorting of the signals is required for operation of the device. Presorting may be accomplished in the frequency domain by narrowing the RF passband of the analysis receiver, or a signal parameter sorting device may be used to provide a prediction gate around the next pulse of the train and which is based upon the time of arrival of previous pulses in that train. The prediction gate can be used to gate the pulse analyzer to measure only the pulses being sorted even from a very dense environment.

The pulse analyzer may be blanked by means of the radar blanking apparatus normally associated with the analysis receiver. In this mode, a pulse is applied as the blanking input to the apparatus whereby it will ignore input pulses for that period. If a blanking pulse is introduced during the measurement cycle, the pulse analyzer is reset automatically and the cycle begins again.

To summarize, the dual-threshold signal conditioner 10 functions essentially to square input signal pulses and eliminate noise to thereby achieve more effective PW measurements. The first pulse that exceeds the higher threshold level $T_2$ initiates the measurement process, and the pulse-width is measured at a lower threshold level which also automatically starts the PRI counter 26 for the first period. The second pulse stops the first period count and begins the second period count that is terminated by the arrival of the third pulse.

The counter control unit 22 gates the three pulses to the PW counter 24 and to the PRI counter 26, and after the third pulse is received, it blocks further pulses from the counters until a reset pulse signal clears and rearms the pulse analyzer circuit.

Upon receipt of the second pulse, the first period count in the PRI counter 26 is shifted into the transfer register 28 where it is stored for conversion to PRF at a later time. The PRI counter 26 is reset by a pulse from the counter control unit 22, whereupon it begins to count the second period. The second period count is stored in the PRI counter 26 after the third pulse is received, and as previously discussed, PW is stored in the PW counter 24.

Figure 4:
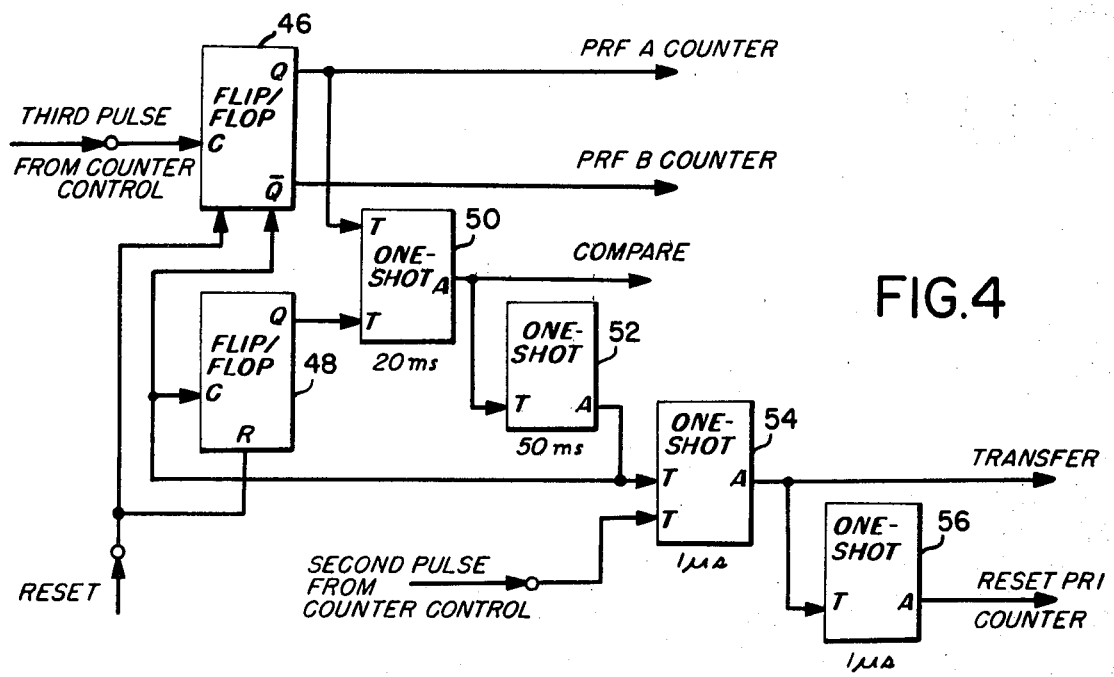
FIG. 4 illustrates in simplified schematic form the comparator control circuit of FIG. 1; and, FIG. 5 illustrates in simplified schematic form the confidence indicator and reset control circuits of FIG. 1.

Control waveforms for the conversion of PRI to PRF are generated in the comparator control unit 40 shown in more detail in FIG. 4. The comparator control unit 40 essentially comprises a logic circuit consisting of two flip-flops 46 and 48 and four one-shot multivibrators 50, 52, 54, and 56. The circuit functions conventionally to produce a PRF A counter pulse, a PRF B counter pulse, a compare pulse, a transfer pulse, and a PRI counter reset pulse.

The conversion process essentially consists of counting up to the stored PRI value at a known rate in a predetermined time period whereby the number of times that the count can proceed is the PRF corresponding to the stored PRI. For example, a PRI measurement clock of 200-kHz could be used with a 1-MHz conversion clock signal to clock the PRF conversion counter 34 at a 1-MHz rate for 20 milliseconds.

Each time that the increasing count in the counter 34 equals that stored in the transfer register 28, the PRF conversion counter 34 is reset, and the count proceeds again from zero. The PRF counter 38 stores the number of such reset commands, and after the first conversion, the transfer register is cleared and the second period count in the PRI counter 22 is shifted into the register. The conversion process is repeated and the PRF for the second period is stored separately in the PRF counter 38.

The PRI, PRF, and PW counters have a limited modulus, and hence, they are subject to overflow if the PRI or PRF is too high or if the PW is too long for storage in the respective counter. Overflow conditions are determined by the confidence indicator 42 which provides a means of resetting the unit automatically in the event of an overflow condition. This is an operator convenience, and a completely manual mode may be selected.

Figure 5:
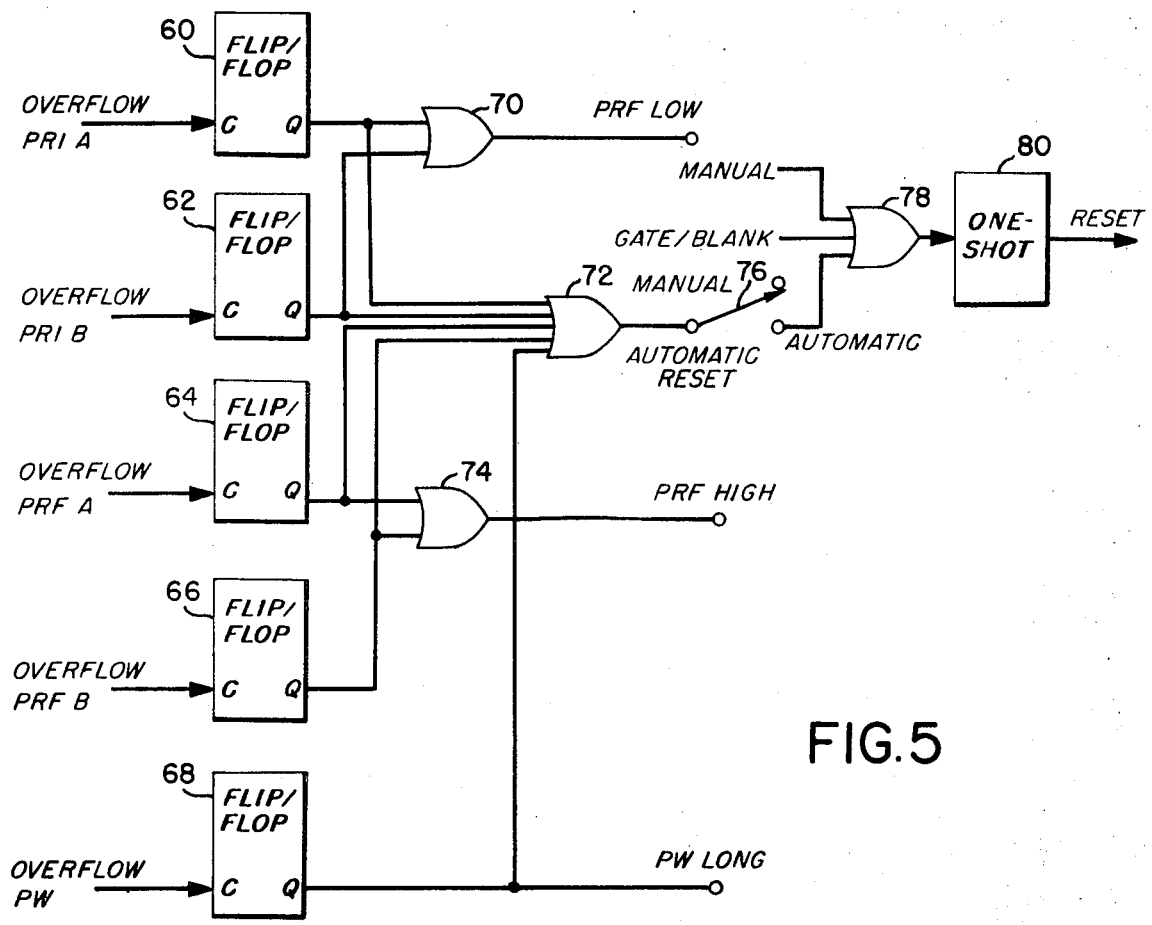

FIG. 5 is a simplified illustration of the confidence indicator circuit 42 and the reset control circuit 20 of FIG. 1. The circuits essentially comprise five flip-flop circuits 60, 62, 64, 66 and 68 having their outputs connected to three NAND gates 70, 72, and 74. The output of element 72 is fed through a switch 76 to the NAND gate 78 which also receives a manual reset signal, and a gate/blank signal. The output thereof is fed to the one-shot multivibrator 80 to produce the reset signal.

In the manual mode, several indicators are provided to display the causes of erroneous readings and in some cases to indicate that an erroneous reading has indeed been acquired. The output of the confidence indicator drives the reset control unit in the automatic mode to cause a master clearing of all the storage units and rearm the unit to process a new signal.

The clock generator 32 can be a crystal controlled clock with a counting rate of 5-MHz, for example. The clock can be divided to a 1-MHz for the PRF conversion counter 34 and can be divided again to 200-kHz for the PRI counter 26.

Receiver frequency can be stored and displayed by applying the frequency in BCD form to the analyzer circuit. A shaft position encoder can be used in conjunction with the ECM analysis receiver to convert the mechanical frequency readout to the BCD electrical form. Two modes of display are possible: one can be a continuous display of the frequency input which can be used to indicate the tuned frequency of the receiver; the other can be a data frequency which is the frequency at which the PW and PRF measurements were made.

Obviously many modifications and variations of the present invention are possible in the light of the above teachings. It is therefore to be understood that within the scope of the appended claims the invention may be practiced otherwise than as specifically described.

What is claimed is:

1. In ECM receiver systems, apparatus for automatically measuring pulsewidth and pulse repetition frequency of incoming video pulses, comprising:

dual threshold means for receiving said video pulses and being responsive thereto to measure pulsewidth at a first threshold level only if the amplitude thereof is substantially equal to or exceeds a higher, second threshold level, to thereby produce a pulsewidth measurement pulse;

first logic gate means for receiving the output of said dual-threshold means for three successive video pulses;

first binary counter means for receiving the output of said logic gate means and for storing three successive pulsewidth measurement pulses;

display means for receiving the output of said first binary counter means to thereby display said three successive pulsewidth measurement pulses;

second binary counter means for receiving the output of said dual-threshold means and for producing successive, first and second pulse repetition interval counts for the first and second of said three successive video pulses;

shift register means for successively receiving the output of said second binary counter means and for storing successively said first and second pulse repetition interval counts for a first selectively predetermined time period;

clock means for providing a selectively predetermined clock signal;

third binary counter means for receiving said clock signal, for a second selectively predetermined time period;

comparator means for receiving the successive outputs from said shift register means and the output from said third binary counter means at the end of said second selectively predetermined time period and for providing an output pulse when both said outputs are substantially equal;

fourth binary counter means for receiving successively said output pulse and for producing an output substantially equal to the pulse repetition frequency of said successive video pulses;

said fourth binary counter means being connected at its output to said display means; and said third binary counter means being connected to the output of said comparator means.

2. The apparatus of claim 1 further including reset means for providing a reset signal to said dual-threshold means, first logic gate means, comparator means, and first, second and third binary counter means.

* * * * *